United States Patent Office 3,267,457
Patented August 16, 1966

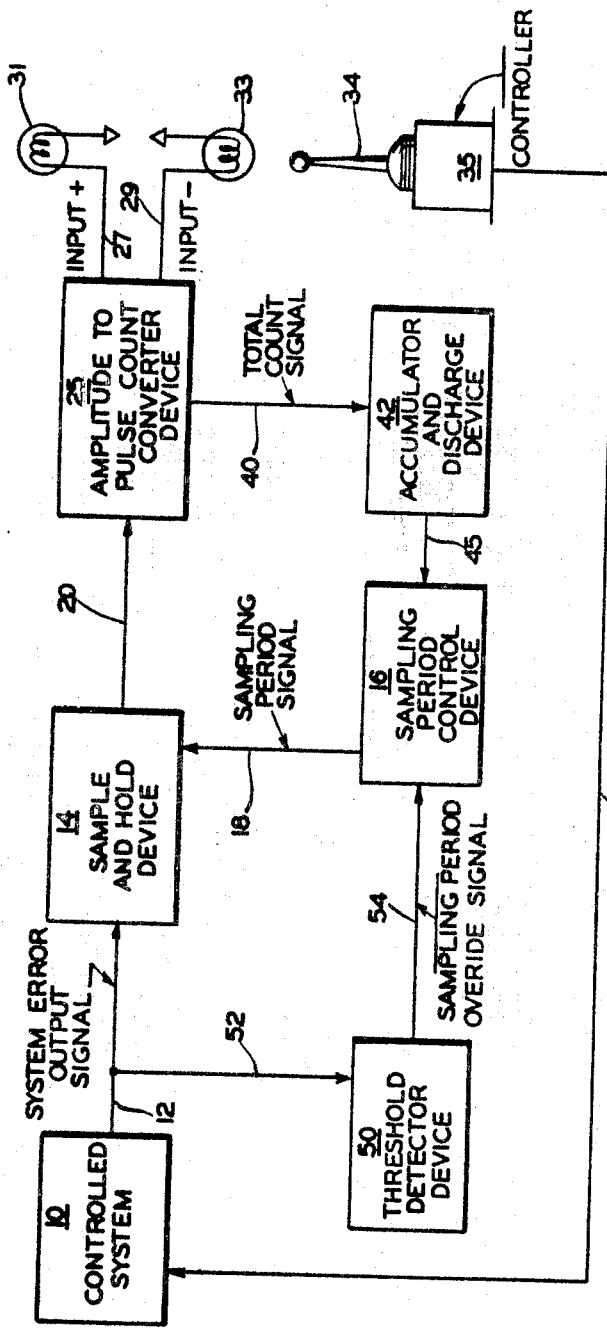

3,267,457
SYSTEM FOR MONITORING CONTROLLED APPARATUS HAVING FLASHING INDICATOR MEANS RESPONSIVE TO ERROR SIGNALS
Arthur Simon, Fair Lawn, N.J., assignor to The Bendix Corporation, Teterboro, N.J., a corporation of Delaware
Filed Apr. 1, 1963, Ser. No. 269,391
8 Claims. (Cl. 340—331)

The invention relates to a self-adaptive visual display means and more particularly to a class of peripheral display means which provide a self-adaptive behavior.

An object of the invention is to provide novel means whereby the overall effect of the combination of elements of the system yields a display and generates a signal that is dependent upon the previous performance of an operator-operative controlled system as well as its current performance so that, if the operator has allowed a relatively large system error to accumulate, the device presents the corrective command information more frequently, while if the operator has done a progressively better job, the errors are presented less frequently and are therefore less distracting to the operator or viewer of the generated signal.

Another object of the invention is to provide a peripheral display means that is dependent upon the previous performance of an operator-operative controlled system.

Another object of the invention is to provide a novel display means in which a system error output signal may be fed into a sample and hold device so that the sampling period is variably determined by a sampling period control device.

Another object of the invention is to provide in such a display means novel means whereby a sampled signal may be converted by an amplitude to pulse count converter to a series of pulses which may in turn be fed to suitable indicating means so that, depending upon the sense or positive and negative sign of the input, the appropriate indicator will flash.

These and other objects and features of the invention are pointed out in the following description in terms of the embodiment thereof which is shown in the accompanying drawing. It is to be understood, however, that the drawing is for the purpose of illustration only and is not a definition of the limits of the invention.

The drawing is a schematic block diagram of a self-adaptive peripheral vision display means embodying the invention.

Referring to the drawing, there is indicated by the numeral 10 a suitable controlled system including means providing an error output signal applied through a conductor 12 to the input of a sample and hold device of conventional type and indicated by the numeral 14. The sampling period of the sample and hold device 14 may be variable and determined by a sampling period control device 16 also of conventional type and including means for applying a sampling period signal through a conductor 18 to the sample and hold device 14.

The system error output signal from the signal means of the controlled system 10 is then applied in the sample and hold device 14 and is in turn conveyed through a conductor 20 to an amplitude to pulse count converter device 25 of conventional type.

The sampled signal applied to the device 25 is then converted by the amplitude to pulse count converter device 25 to a series of pulses which are selectively fed through conductors 27 and 29 to peripherally located condition indicator devices or light sources 31 and 33 to effect energization thereof depending upon the sense or sign of the input signal applied through the conductor 20 to the device 25.

Thus, depending upon the sign of the signal input applied through the conductor 20 to the device 25, the appropriate indicator lamp 31 or 33 will flash. The number of flashes will increase as the system error of the controlled system 10 increases.

The operator then, in response to the flashes of the lamp indicators 31 or 33 may reduce the error by moving a suitable control lever 34 of a controller 35 of conventional type in an appropriate direction and in a proportional sense to the number of flashes. Such adjustment of the control lever 34 is effective to cause the controller 35 to provide a control signal through a conductor 37 to the controlled system 10 so as to tend to correct the error of the controlled system 10. An optimum flash rate of the lamp indicators 31 and 33 may be set independently of the system error.

Further, the amplitude to pulse count converter 25 applies through a conductor 40 pulses for controlling an accumulator and discharge device 42 which may be of a conventional type and which is so arranged as to convert the total pulse count to a signal to be applied to the device 16 to control the sampling period.

The device 42 may include, for example, a D.C. charging circuit of conventional type to effect this result on an analog basis. Other suitable devices may be used in the accumulator device 42.

The accumulator and discharge device 42 also has provided therein a slow signal discharging means which in effect may reduce the accumulated signal to zero as time elapses. Thus the accumulator and discharger device 42 may generate a signal which is both time dependent and error dependent. This signal in turn is fed through a conductor 45 to the sampling period control device 16 so as to set the sampling period in accordance with the discharge generator signal applied through the conductor 45.

Further, the sampling period control device 16 may include suitable means whereby a minimum sample period is preserved. A threshold detector device 50 having an input connected through a conductor 52 to the system error output signal applied to the conductor 12 in turn applies a sampling period override signal through an output conductor 54 to the sampling period control device 16 so as to override the normal operation of the sample and hold device 14 as in the case of a rapid large error build-up before the normal sampling time has elapsed.

In the operation of the system shown in the drawing, the overall effect of the combination of devices shown thereby is to provide means for generating a warning signal at indicator lamp 31 or 33 that is dependent upon the previous performance of the operator-operative control 34 of the controlled system 10 as well as its current performance. Thus, if the operator of the controller 35 of the controlled system 10, has permitted a relatively large error to accumulate, the self-adaptive peripheral display means 31 and 33 presents corrective command information more frequently. However, if the operator has done a progressively better job, the corrective command information is presented less frequently, and therefore, is less distracting.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In a condition indicator means, the combination comprising means for generating a controlled system error output signal, a sample and hold device for receiving said error signal, means for varying the sampling period of said sample and hold device including a sampling period control device, an amplitude to pulse count converter device for receiving an output signal from said sample and hold device, said amplitude to pulse count converter device including means to selectively apply the sampled signal to first and second output means dependent upon the sense of the sampled signal, a first condition warning device operated by the first output means and a second condition warning device operated by the second output means, means for providing a total count signal output from the amplitude to pulse count converter device, and an accumulator and discharge device operatively connected to the last-mentioned output, said accumulator and discharge device including means to accumulate said count signal and having an output connected to the sampling period control device so as to set the sampling period of the sampling period control device in accordance with the accumulated count signal.

2. The combination defined by claim 1 in which said accumulator and discharge device includes means to reduce the accumulated count signal with an elapse of time so as to provide a signal to the sampling period control device which is both dependent upon the elapse of time and the controlled system error signal.

3. The combination defined by claim 2 in which the sampling period control device includes means to maintain a minimum sampling period.

4. The combination defined by claim 1 including a threshold detector device having an input connected to the controlled system error output signal and an output operably connected to the sampling period control device to override normal operation of the sample and hold device upon a relatively rapid and large increase in the error signal before the normal sampling time had elapsed.

5. The combination defined by claim 3 including a threshold detector device having an input connected to the controlled system error output signal and an output operably connected to the sampling period control device to override normal operation of the sample and hold device upon a relatively rapid and large increase in the error signal before the normal sampling time had elapsed.

6. The combination defined by claim 5 including an operator-operative controller for operating the controlled system so as to vary the controlled system error output signal in accordance with the condition indicated by the first and second condition warning device.

7. In a condition indicator means, the combination comprising means for generating a controlled system error output signal, a sample and hold device for receiving said error signal, means for varying the sampling period of said sample and hold device including a sampling period control device, an amplitude to pulse count converter device for receiving an output signal from said sample and hold device, said amplitude to pulse count converter device including means to selectively apply the sampled signal to first and second output means dependent upon the sense of the sampled signal, a first condition warning device operated by the first output means and a second condition warning device operated by the second output means, a threshold detector device having an input connected to the controlled system error output signal and an output operably connected to the sampling period control device to override normal operation of the sample and hold device upon a relatively rapid and large increase in the error signal before the normal sampling time had elapsed.

8. The combination comprising an operator-operative controlled system including means for effecting an error output signal, a sample and hold device operatively connected to the error output signal from the controlled system, said sample and hold device having an output, an amplitude to pulse count converter device operatively connected to the output of the sample and hold device, said amplitude to pulse count converter device including means to selectively apply a signal from the sample and hold device to first and second output means dependent upon the sense of said signal, a first warning device operated by the first output means and a second warning device operated by the second output means, means for providing a total count output signal from the amplitude to pulse count converter device, an accumulator and discharge device operatively connected to the last-mentioned output, said accumulator and discharge device including means to accumulate said count signal and having an output connected to the sampling period control device so as to vary the sampling period of the last-mentioned control device in accordance with the accumulated count signal, said accumulator and discharge device including means to reduce the accumulated count signals with an elapse of time so as to provide a signal to the sampling period hold device which is variable both with the elapse of time and with the controlled system error, and a threshold detector device having an input connected to the controlled system error output signal and an output operatively connected to the sampling period control device to override normal operation of the sample and hold device upon a relatively rapid and large increase in the error signal before the normal sampling time had elapsed, whereby the first and second warning devices may effectively indicate to the operator of the controlled system the operative condition thereof.

No references cited.

NEIL C. READ, *Primary Examiner.*

H. PITTS, *Assistant Examiner.*